(12) United States Patent
Samaha (10) Patent No.: US 8,295,864 B2
(45) Date of Patent: Oct. 23, 2012

(54) SENDING AND RECEIVING TEXT-BASED MESSAGES OVER A MOBILE PHONE VIA A NETWORK CONNECTED COMPUTER

(76) Inventor: Tareq A. Samaha, Roseville, CA (US)

(*) Notice: Subject to any disclaimer, the term of this patent is extended or adjusted under 35 U.S.C. 154(b) by 281 days.

(21) Appl. No.: 12/575,757

(22) Filed: Oct. 8, 2009

(65) Prior Publication Data

US 2010/0093382 A1   Apr. 15, 2010

Related U.S. Application Data

(60) Provisional application No. 61/104,695, filed on Oct. 10, 2008.

(51) Int. Cl.
*G06F 15/18* (2006.01)

(52) U.S. Cl. .................... 455/466; 455/412.2

(58) Field of Classification Search ............... 455/412.1, 455/412.2, 414.1, 414.2, 466
See application file for complete search history.

(56) References Cited

U.S. PATENT DOCUMENTS

| | | | |
|---|---|---|---|
| 6,662,023 B1 | 12/2003 | Helle | |
| 7,027,808 B2 | 4/2006 | Wesby | |
| 7,096,033 B1 | 8/2006 | Bell | |
| 7,113,803 B2 | 9/2006 | Dehlin | |
| 7,181,217 B2 | 2/2007 | Kalavade | |
| 7,277,693 B2 | 10/2007 | Chen et al. | |
| 2002/0085701 A1 | 7/2002 | Parsons et al. | |
| 2004/0185883 A1 | 9/2004 | Rukman | |
| 2005/0104717 A1 | 5/2005 | Kaplan | |
| 2005/0187756 A1* | 8/2005 | Montgomery et al. | 704/9 |
| 2006/0014530 A1 | 1/2006 | Denenberg et al. | |
| 2006/0218234 A1 | 9/2006 | Deng et al. | |
| 2007/0190995 A1 | 8/2007 | Wang et al. | |
| 2009/0111489 A1* | 4/2009 | Wilson | 455/466 |

FOREIGN PATENT DOCUMENTS

WO    2009061677 A1    5/2009

* cited by examiner

*Primary Examiner* — Sam Bhattacharya
(74) *Attorney, Agent, or Firm* — Schneck & Schneck; David M. Schneck (57) ABSTRACT

A method for sending and receiving text-based messages using a proxy mobile phone is disclosed. Sending includes receiving via a global communication network, at a server, an outgoing text-based message and sending the message and a directive for a proxy mobile phone to receive the message and forward the message via a wireless telephonic network to a destination device specified by a destination identifier. Receiving includes receiving, at the server, an incoming text-based message and an origin identifier indicating the message has been received by the proxy mobile phone via the wireless telephonic network and forwarded by the proxy mobile phone to the server via the global communication network. The incoming text message is provided by the server for access via the global communication network. Further, a system is disclosed having a server and a client equipped mobile phone, the system being configured to use the method.

20 Claims, 7 Drawing Sheets

SENDING AND RECEIVING TEXT-BASED MESSAGES OVER A MOBILE PHONE VIA A NETWORK CONNECTED COMPUTER

CROSS-REFERENCE TO RELATED APPLICATION

This application claims priority from U.S. provisional application No. 61/104,695, filed Oct. 10, 2008.

TECHNICAL FIELD

The present invention relates generally to telecommunications and, more specifically, mobile phones and text-based messages such as Short Message Service (SMS) messages.

BACKGROUND

Sending and receiving Short Message Service (SMS) messages on a cell phone, also known as "texting", is a popular and growing form of text-based communication. SMS messages are usually limited to a maximum character length of 140 8-bit or 160 7-bit characters.

To send an SMS message from a cell phone (cellular telephone), the user enters the text-based message characters sequentially, using the cell phone keypad. To provide a destination for the SMS message, the user enters the destination cell phone number, using the cell phone keypad. The SMS message is then sent from the cell phone, through the cellular network, to the destination cell phone.

Receiving an SMS message is straightforward. The message is delivered through the cellular network to the recipient cell phone.

Several services are known for routing SMS messages into or out of the cellular network. An aggregator delivers SMS messages to a cellular provider's Short Message Service Center (SMSC). A Direct to SMSC Gateway is used by the aggregator to connect from the Internet to the cellular provider's SMSC, so that SMS text messages may be sent or received by e-mail, from webpages or other applications, using the appropriate format change. The SMSC holds the message until the user uploads the message.

A Direct to Mobile Gateway allows SMS text messages to be sent or received by e-mail, from webpages or other applications, directly connected into the cellular network, without need of the SMSC.

Various business models exist for payment from subscribers to providers. A cell phone user may be charged $0.10 for each text message sent or received, or may pay an agreed-upon service charge for each billing cycle for unlimited texting.

Aggregators typically charge $0.10 for each SMS message sent or received via the Internet, independently of whether a cell phone user has unlimited texting. Direct to Mobile Gateway providers, likewise, typically charge for each SMS message sent or received via the Internet, independently of whether a cell phone user has unlimited texting.

While conventional approaches operate well for their intended purpose, further improvements are sought. The improvements may be performance-based and/or cost-based, such as providing the ability to send and receive SMS or other cellular network text-based messages to or from a mobile phone via the Internet, without incurring charges from or making use of an aggregator.

SUMMARY

A method for sending and receiving text-based messages is described. Sending an outgoing text-based message includes processes running on a server, and may include processes running on a proxy mobile phone. Receiving an incoming text-based message includes processes running on the server, and may include processes running on the proxy mobile phone.

To send an outgoing text-based message, the message is received via a global communication network at the server. The outgoing text-based message is received in a global communication network-based format. Along with the outgoing text-based message, a destination identifier is received at the server. The destination identifier is associated with a destination device on a wireless telephonic network. The destination identifier may be or include an address of a destination device on the wireless telephonic network. For example, the destination identifier may be the phone number or area code and phone number of the destination cellular telephone.

The outgoing text-based message is sent via the global communication network from the server. Along with the message, a directive is sent from the server. The directive is for a proxy mobile phone. The directive is for the proxy mobile phone to receive the outgoing text-based message via the global communication network. The directive is further for the proxy mobile phone to forward the outgoing text-based message via a wireless telephonic network. According to the directive, the outgoing text-based message is to be forwarded in a wireless telephonic network-based format, and is to be forwarded to the destination device specified by the destination identifier.

Sending an outgoing text-based message may further include forwarding via the wireless telephonic network from the proxy mobile phone. To forward from the proxy mobile phone, the outgoing text-based message is forwarded in the wireless telephonic network-based format and forwarded with the address of the destination device.

To receive an incoming text-based message, the message is received via the global communication network at the server. The incoming text-based message is received in the global communication network-based format. Along with the incoming text-based message, an origin identifier is received at the server. The origin identifier is associated with an originating device on the wireless telephonic network. The origin identifier indicates that the incoming text-based message has been received in the wireless telephonic network-based format via the wireless telephonic network, at the proxy mobile phone. The origin identifier indicates that the incoming text-based message has been forwarded by the proxy mobile phone to the server via the global communication network. The origin identifier may be or include an address of an originating device on the wireless telephonic network.

The incoming text-based message is provided from the server for access via the global communication network. The incoming text-based message is provided for access in the global communication network-based format. Further, the address of the originating device may be provided from the server for access via the global communication network.

Receiving an incoming text-based message may further include receiving via the wireless telephonic network at the proxy mobile phone and forwarding via the global communication network from the proxy mobile phone to the server.

To receive at the proxy mobile phone, the incoming text-based message may be received via the wireless telephonic network at the proxy mobile phone. The incoming text-based message may be received by the proxy mobile phone in the wireless telephonic network-based format with an address of an originating device on the wireless telephonic network.

To forward from the proxy mobile phone, the incoming text-based message may be forwarded from the proxy mobile phone to the server in the global communication network-based format. The message may be forwarded with the address of the originating device.

Further, a system for sending and receiving text-based messages is described. The system includes a server connectable to the global communication network and a client equipped mobile phone. The client equipped mobile phone is connectable to the wireless telephonic network. The client equipped mobile phone is further connectable to the global communication network. The client equipped mobile phone is configured to communicate with the server via the global communication network.

The server is configured to send via the global communication network an outgoing text-based message. According to the configuration, the outgoing text-based message is to be sent via the global communication network to the client equipped mobile phone in response to the server receiving via the global communication network the outgoing text-based message. The outgoing text-based message is to be addressed to a recipient mobile phone.

The client equipped mobile phone is configured to send via the wireless telephonic network the outgoing text-based message in a wireless telephonic network-based format. According to the configuration, the outgoing text-based message in the wireless telephonic network-based format is to be derived from the outgoing text-based message and addressed to the recipient mobile phone. The outgoing text-based message is to be sent from the client equipped mobile phone in response to receiving at the client equipped mobile phone the outgoing text-based message via the global communication network from the server.

The client equipped mobile phone is further configured to send to the server via the global communication network an incoming text-based message. According to the configuration, the incoming text-based message to be sent from the client equipped mobile phone to the server is to be derived from an incoming text-based message received by the client equipped mobile phone in the wireless telephonic network-based format via the wireless telephonic network.

The server is further configured to provide access to the incoming text-based message via the global communication network.

DETAILED DESCRIPTION

The method and system in accordance with the invention allow sending and receiving text-based messages such as Short Message Service (SMS) messages over a mobile phone via a network connected computer, as will be described regarding FIGS. 4-7. In embodiments, a text-based "conversation" involving two cell phones may occur with at least one participant utilizing his or her cell phone as a proxy device while sending and receiving messages using a computer connected to the global communications network referred to as the "Internet". The limited use of the participant's cell phone as a proxy device may be transparent to the other participant. That is, message information displayed to a participant will indicate that the message originated at the proxy cell phone, rather than at the computer.

Use of the method and system allows flexibility with respect to the user's cell phone. A user may use the cell phone directly for sending or receiving SMS messages, or the user may use the cell phone as the proxy device. When sending a message from an Internet connected computer, using the cell phone as a proxy to forward the message to a destination cell phone, the convenience of the full-size computer keyboard and display may prove advantageous. When receiving a message on an Internet connected computer, using the cell phone as a proxy to forward the message from an originating cell phone, the convenience of the computer display may prove advantageous. The convenience of using differing Internet connected devices to send or receive messages via the proxy cell phone may provide flexibility of access. Continuity and ease of contact by a third-party is a further possible benefit. The third-party may use the proxy cell phone number in order to reach the user of the method and system, regardless of the various Internet connected devices employed by the user of the method and system to send or receive messages via the proxy cell phone.

Figure 1:
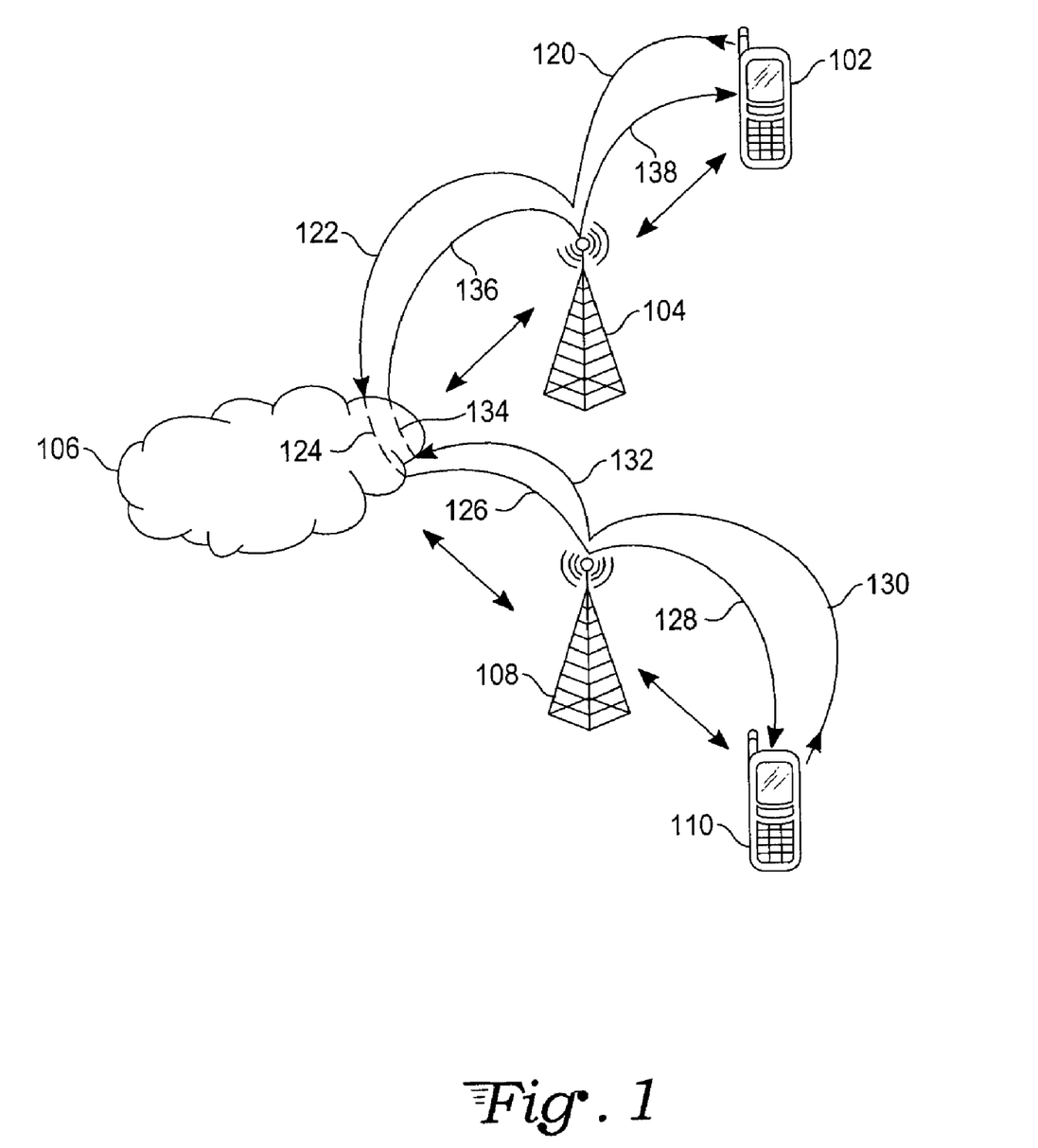
FIG. 1 is a system diagram showing standard SMS message sending and receiving.
Figure 2:
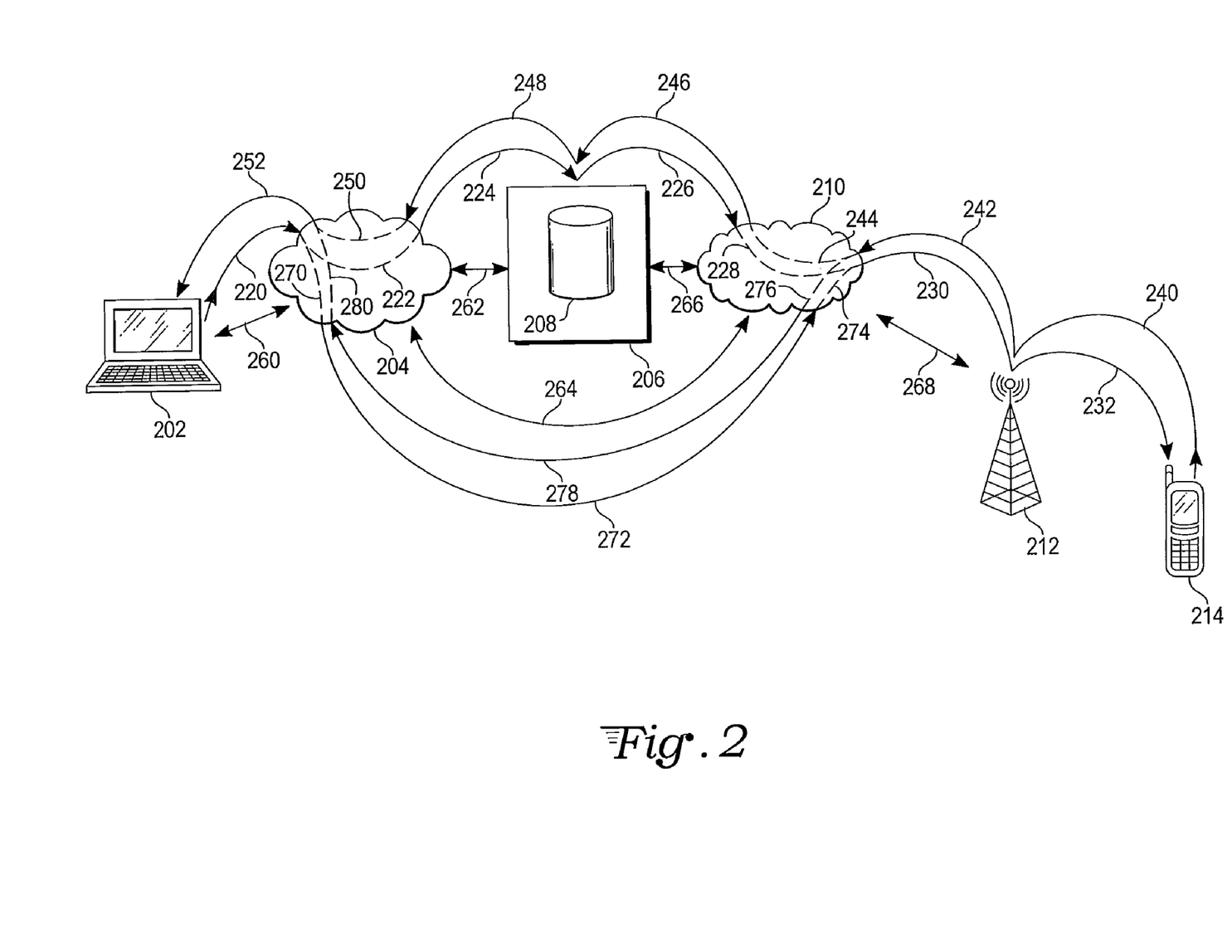
FIG. 2 is a system diagram showing SMS message routing using a standard aggregator.
Figure 3:
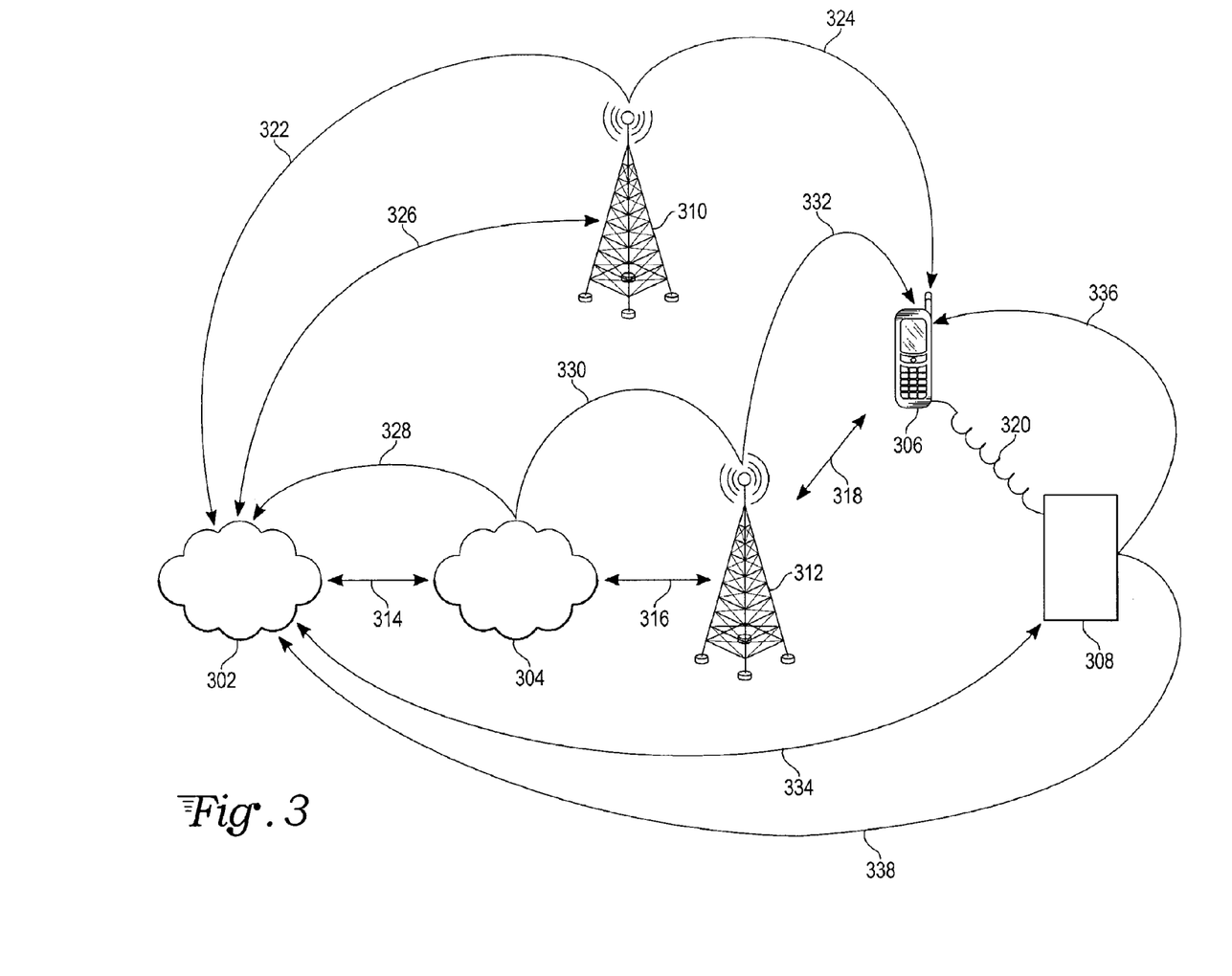
FIG. 3 is a system diagram showing an Internet connected cell phone.

In order to better convey the method and system, SMS technology, techniques and paths are shown in FIGS. 1-3 and discussed below. Terminology is also discussed.

A mobile phone is a wireless phone that operates in a wide service area and is supported by a wireless network. The terms "phone" and "telephone" are herein used interchangeably. A cell phone is a type of mobile telephone that is supported by a telephonic cellular network. The term "cell phone" includes Internet connectable cell phones and devices with cell phone capabilities, such as cell phone-equipped Personal Digital Assistants (PDAs) e.g. Blackberry and iPhone. Another type of mobile phone is a satellite phone, which is supported by a satellite network. In contrast, a cordless telephone is also a wireless phone, but operates only in a limited range such as an office or a home, and from a fixed base station rather than a network.

In FIG. 1, a cell phone 102 is sending and receiving Short Message Service (SMS) messages to and from another cell phone 110, in a manner known in the art. The cell phones 102 and 110 are connected to a cellular network, as serviced by a cellular provider.

When sending a text-based message from the cell phone 102 to the destination cell phone 110, using the cellular network, the message travels through the cellular network along a path using a series of hops, using the formatting, protocols and techniques of SMS. Upon transmission of the text message by the cell phone 102, the message travels Over the Air (OTA) in a hop 120 to a cellular tower 104, in a hop 122 to the cellular network "cloud" 106, in a hop 124 through the cellular network "cloud" 106, in a hop 126 to a cellular tower 108, and in a hop 128 from the cellular tower 108 to the destination cell phone 110.

When receiving a text-based message on cell phone 102, using the cellular network, the message travels through the cellular network in an opposing direction. Upon transmission of the text message by an originating cell phone 110, the message travels Over the Air in a hop 130 to the cellular tower 108, in a hop 132 to the cellular network "cloud" 106, in a hop 134 through the cellular network "cloud", in a hop 136 to the cellular tower 104, and in a hop 138 from the cellular tower 104 to the cell phone 102.

A first user, who has cell phone 102, may be engaging in a series of text-based messages solely with a second user, who has cell phone 110. Relative to the cell phone 102 of the first user, the destination cell phone for messages sent from cell phone 102 is the cell phone 110 of the second user. Further, the originating cell phone for messages received on cell phone 102 is the cell phone 110 of the second user. However, the destination cell phone and the originating cell phone may be two different cell phones, in the case where the first user is communicating with a second user and a third user, each of whom has a cell phone. The first user may send a text message to a destination cell phone of a second user, and receive a text message from an originating cell phone of a third user. Other combinations are possible.

With reference to FIG. 2, and as discussed in the Background section, text-based messages may be routed into or out of the cellular network, in a manner known in the art. A user of the Internet, a global communication network, may wish to send a text message from an Internet connected computer to a cell phone, or receive a text message on an Internet connected computer as sent from a cell phone. In order to use an Internet connected service to send and receive text-based messages intended for a cellular network, the user usually enters into a service and payment agreement with a provider. Alternatively, services may be provided in exchange for a willingness on the part of the user to view advertisements.

One type of provider, known in the art, is an aggregator. The aggregator uses a direct to Short Message Service Center Gateway 262, to deliver SMS messages to a cellular provider's Short Message Service Center (SMSC) 206. The SMSC Gateway 262 connects between the Internet "cloud" 204 and the cellular provider's SMSC 206, where SMS messages optionally may be stored in an SMS storage database 208. Messages traveling between an Internet connected computer 202 and a cell phone 214 travel in a series of hops through the Internet "cloud" 204 and the cellular network "cloud" 210.

A message being sent, via the aggregator, from the computer 202 travels in a hop 220 along an Internet connection 260 to the Internet "cloud" 204, in a hop 222 through the Internet "cloud" 204, and in a hop 224 through the SMSC Gateway 262 to the SMSC 206, where the message optionally may be stored in the SMS storage database 208. If the cell phone 214 is operational and in-service with an Over the Air connection to the cellular network "cloud" 210, the SMS message travels in a hop 226 from the SMSC 206 along the SMSC path 266 to the cellular network "cloud" 210, in a hop 228 through the cellular network "cloud" 210, in a hop 230 to the cellular tower 212 along the cellular network "cloud" to tower connection 268, and in a hop 232 from the cellular tower 212 to the destination cell phone 214. If the cell phone 214 is not in-service, either by being outside of any service area or by being turned off, the message is stored at the SMSC 206 until the destination cell phone 214 is in-service. When the connection is made to the cell phone 214, the message is sent immediately.

A message being received, via the aggregator, on the computer 202, travels in a hop 240 from the originating cell phone 214 to the cellular tower 212, in a hop 242 to the cellular network "cloud" 210, in a hop 244 through the cellular network "cloud" 210, and in a hop 246 to the SMSC 206, where the message optionally may be stored in the SMS storage database 208. When or if the user of the Internet connected computer 202 connects via the Internet to the SMSC 206, the message travels from the SMSC 206 in a hop 248 through the SMSC Gateway 262 to the Internet "cloud" 204, in a hop 250 through the Internet "cloud" 204, and in a hop 252 to the computer 202.

A further type of provider, known in the art, uses a Direct to Mobile Gateway 264 to bypass the SMSC. The Direct to Mobile Gateway 264 connects directly from the Internet "cloud" 204 to the cellular network "cloud" 210. Messages traveling between an Internet connected computer 202 and a cell phone 214 travel in a series of hops through the Internet "cloud" 204 and the cellular network "cloud" 210.

A message being sent, via the Direct to Mobile Gateway 264, from the computer 202 travels in a hop 220 along an Internet connection 260 to the Internet "cloud" 204, in a hop 270 through the Internet "cloud" 204, in a hop 272 through the Direct to Mobile Gateway 264 from the Internet "cloud" 204 to the cellular network "cloud" 210, in a hop 274 through the cellular network "cloud" 210, in a hop 230 to the cellular tower 212, and in a hop 232 to the destination cell phone 214.

A message being received, via the Direct to Mobile Gateway 264, on the computer 202, travels in a hop 240 from the originating cell phone 214 to the cellular tower 212, in a hop 242 to the cellular network "cloud" 210, in a hop 276 through the cellular network "cloud" 210, in a hop 278 through the Direct to Mobile Gateway 264 from the cellular network "cloud" 210 to the Internet "cloud" 204, in a hop 280 through the Internet "cloud" 204, and in a hop 252 to the computer 202

With reference to FIG. 3, an Internet connectable cell phone 306 is shown connecting to the Internet "cloud" 302 in various ways. In order to make an Internet connection, only one such connection is needed.

The Internet connectable cell phone 306 may connect to the Internet using a wireless Internet connection differing from the wireless connection to the cellular network. Examples of such a wireless Internet connection are a WiFi connection, also known as a wireless hotspot such as may be set up in an Internet café, or a wireless router connected to a DSL modem, as may be set up for use in a home or a business. The cell phone 306 broadcasts to and receives from an antenna 310, and the antenna has a connection path 326 to and from the Internet "cloud" 302, as known in the art. Signals and data may travel between the cell phone 306 and the Internet "cloud" 302 by a hop 324 between the cell phone 306 and the antenna 310 and a hop 322 between the antenna 310 and the Internet "cloud" 302.

Further, the Internet connectable cell phone 306 may connect to the Internet using a wired connection to the Internet. The cell phone 306 is connected by a wire 320 or cable, such as a USB cable, to an Internet connected device 308. The Internet connected device 308 may be a laptop computer with a hardwired connection 334 to the Internet "cloud" 302, as known in the art. Signals and data may travel between the cell phone 306 and the Internet "cloud" 302 by a hop 336 over the wire 320 or cable between the cell phone 306 and the Internet connected device 308 and a hop 338 over the hard wired connection 334 between the Internet connected device 308 and the Internet "cloud" 302. In a variation (not shown), the cell phone 306 is connected by a wire 320 or cable to the Internet connected device 308, while the Internet connected device 308 has a wireless connection to the Internet, such as by WiFi.

Still further, the Internet connectable cell phone 306 may connect to the Internet using a cellular network portal 314 to the Internet. The cell phone 306 broadcasts to and receives from a cellular tower 312. The cellular tower 312 is connected to the cellular network "cloud" 304 by the cellular network "cloud" to tower connection 316. The cellular network "cloud" 304 is connected to the Internet "cloud" 302 through the cellular network portal 314. Signals and data may travel between the cell phone 306 and the Internet "cloud" 302 by a hop 332 between the cell phone 306 and the cell tower 312, a hop 330 between the cell tower 312 and the cellular network "cloud" 304, and a hop 328 through the cellular network portal 314 between the cellular network "cloud" 304 and the Internet "cloud" 302.

With reference to FIGS. 4-7, an Internet connectable cell phone 408 or other mobile phone with suitable capabilities is used in a method and system for sending and receiving text messages, in accordance with an embodiment of the invention. A mobile telephone suitable for use with the system and method has the capability of connecting to a global communication network such as the Internet and has the further capability of connecting to a wireless telephonic network such as a cellular network or a satellite network. A mobile telephone suitable for use with the system and method has the capability of receiving a text-based message on one of the wireless telephonic network or the global communication network, and forwarding the message on the other of the wireless telephonic network or the global communication network.

Figure 4:
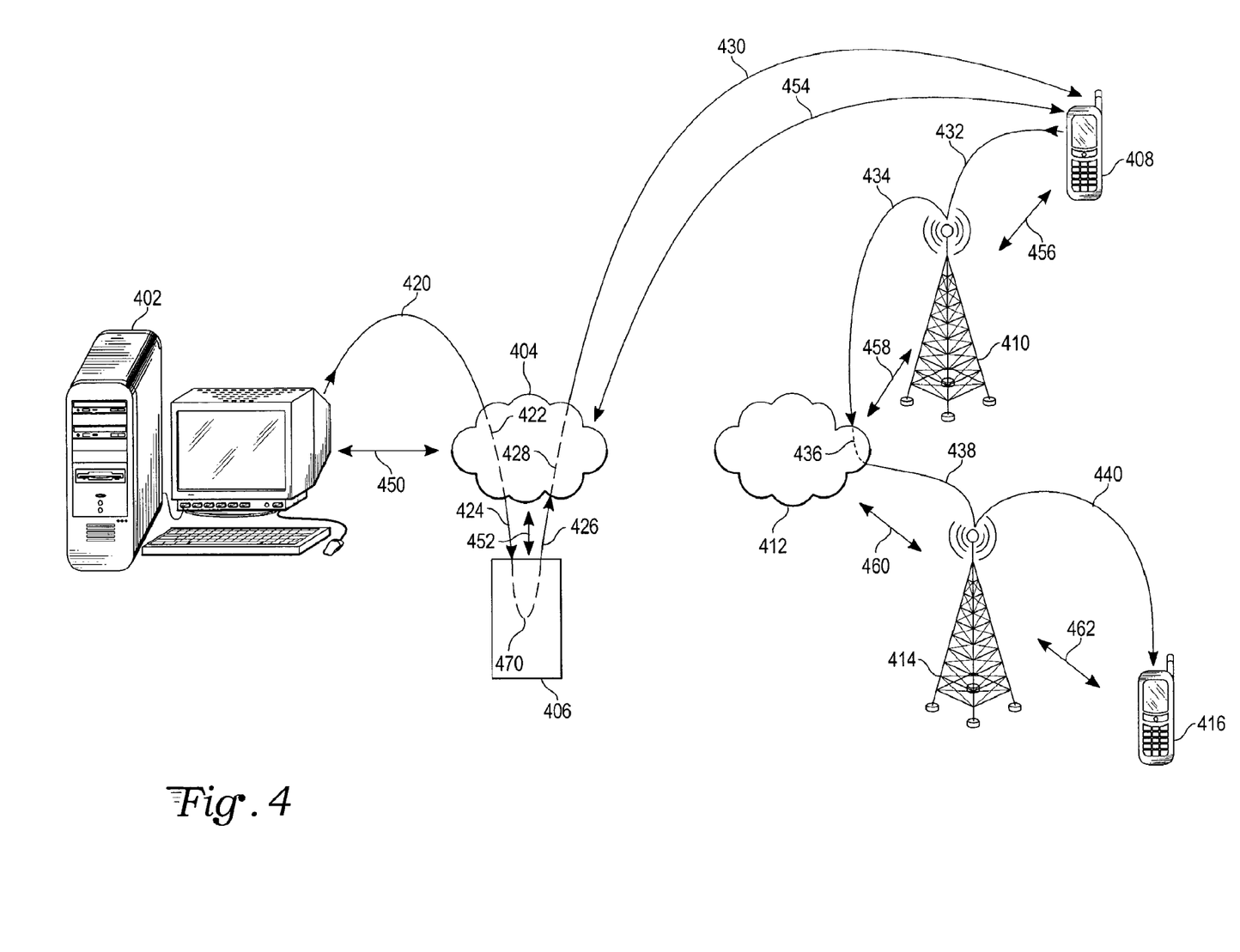
FIG. 4 is a system diagram showing an outgoing SMS message routed via a server, in accordance with the present invention.

In FIG. 4, a text-based message is sent from an Internet connected computer 402 or other Internet connected device to a destination cell phone 416, using the Internet connectable cell phone 408 as a proxy. In this manner, charges to an aggregator are avoided, since an aggregator is not used. In order to avoid paying a cost for each text message received or sent on the Internet connectable cell phone 408, a plan allowing unlimited texting may be used.

A server 406, which may be a computing device operating software and allowing manipulation of or access to data or files, is connected to the Internet "cloud" 404. A server is a combination of hardware or software designed to provide services, and may include one or more computers, one or more types of server software or one or more types of client software, in a cooperative arrangement.

A computer 402 or other interactive device is connected to the Internet via Internet connection 450. The computer 402 may be executing client software or running a Web browser, and communicating with the server 406.

The proxy cell phone 408 is connected to the Internet via Internet connection 454, using one of the setups described with reference to FIG. 3, or another suitable Internet connection setup. The proxy cell phone 408 is further connected to the cellular network via Over the Air connection 456 to the cellular tower 410, as is commonly indicated by the cell phone being "in-service" and showing antenna bars on the display. The proxy cell phone 408 is a cell phone with Internet connection capability, and may be executing client software. As is known in the art, a device in which client software is installed or executing may be referred to as a client equipped device. The cell phone 408 acts as a proxy device, an intermediary along the connection between sender and receiver. Usually, the user desiring to send or receive text messages with the Internet connected computer 402, using the method and system, is the owner of the proxy cell phone 408. However, the proxy cell phone 408 is not required to be in the immediate vicinity of the user, and may be located at some distance from the user, for example if the user left the cell phone in an activated condition at home or at a business location.

Cellular tower 410 is connected to the cellular network "cloud" 412 by the cellular tower connection 458. Similarly, cellular tower 414 is connected to the cellular network "cloud" 412 by the cellular tower connection 460. The cell phone 416, which is a destination cell phone for purposes of sending a text-based message from the computer 402, is connected to the cellular network via Over the Air connection 462 to the cellular tower 414.

To send a text-based message from the Internet connected computer 402 to a destination cell phone 416, using the server 406 and the proxy cell phone 408, the user enters the text-based message at the computer 402. To specify a destination for the text-based message, the user enters a destination identifier. The destination identifier may be the area code and phone number for the destination cell phone 416. The outgoing message is sent, along with the destination identifier, using an appropriate Internet-based protocol and format, in a hop 420 from the computer 402 to the Internet "cloud" 404, in a hop 422 through the Internet "cloud" 404, and in a hop 424 to the server 406.

After the server 406 receives the outgoing text-based message, the server sends the message in a hop 426 to the Internet "cloud" 404. The message travels in a hop 428 through the Internet "cloud" 404 and in a hop 430 to the proxy cell phone 408, via the Internet connection 454. The destination identifier, specifying the destination of the message, travels along with the message.

In one example, client software executing on the proxy cell phone 408 interprets the destination identifier as a directive to receive the outgoing text-based message via the global communication network and to forward the message via the cellular network to the destination device. In a further example, the server 406 sends a command directing the proxy cell phone to receive and forward the outgoing text-based message. The destination identifier or a command may serve as a directive.

The proxy cell phone 408 receives the outgoing text-based message. Depending upon the format or protocol of the text-based message as received by the proxy cell phone 408, the proxy cell phone 408 sends or forwards the text-based message as-is or sends a text-based message derived from the text-based message received. The proxy cell phone 408 sends the text-based message or a derived text-based message in a format and protocol suitable for the cellular network. For example, the message may be sent from the computer 402 over the Internet using an instant messaging format, an e-mail format or a text file format, and the cell phone 408 may send the message over a cellular network using an SMS format. In a further example, the message may arrive via the Internet and be received by the proxy cell phone 408, with the text-based message having a character length greater than the maximum length or maximum character count of an SMS message. The proxy cell phone 408 may break up or separate the text-based message into a plurality of SMS messages, with each SMS message having a character count less than or equal to the SMS message maximum character count. Thus, the proxy cell phone 408 sends or forwards the text-based message, a reformatted version of the text-based message, the text-based message using a different protocol, a sequential series of SMS messages based upon the original text-based message, or another message derived from the text-based message.

The proxy cell phone 408 sends or forwards the outgoing text-based message by sending the text-based message or a text-based message derived from the received text-based message in a hop 432 to the cellular tower 410, in a hop 434 to the cellular network "cloud" 412, in a hop 436 through the cellular network "cloud" 412, in a hop 438 to the cellular tower 414 and in a hop 440 to the destination cell phone 416. The proxy cell phone 408 uses the destination identifier, which specifies the destination or address for the message, to forward the message to the destination cell phone 416. The outgoing message is sent from the computer 402 via the Internet to the proxy cell phone 408, and forwarded by the proxy cell phone 408 over the cellular network to the destination cell phone 416. If the owner of the cell phone 408 subscribes to unlimited texting and Internet connection, the message is sent without incurring any aggregator charges and without incurring any costs per message to the owner of the cell phone 408 or the computer 402.

In an example, the outgoing text-based message may be routed through the server 406 or stored 470 at the server 406 until a communication between the server 406 and the proxy cell phone 408 is established or reestablished.

Figure 5:
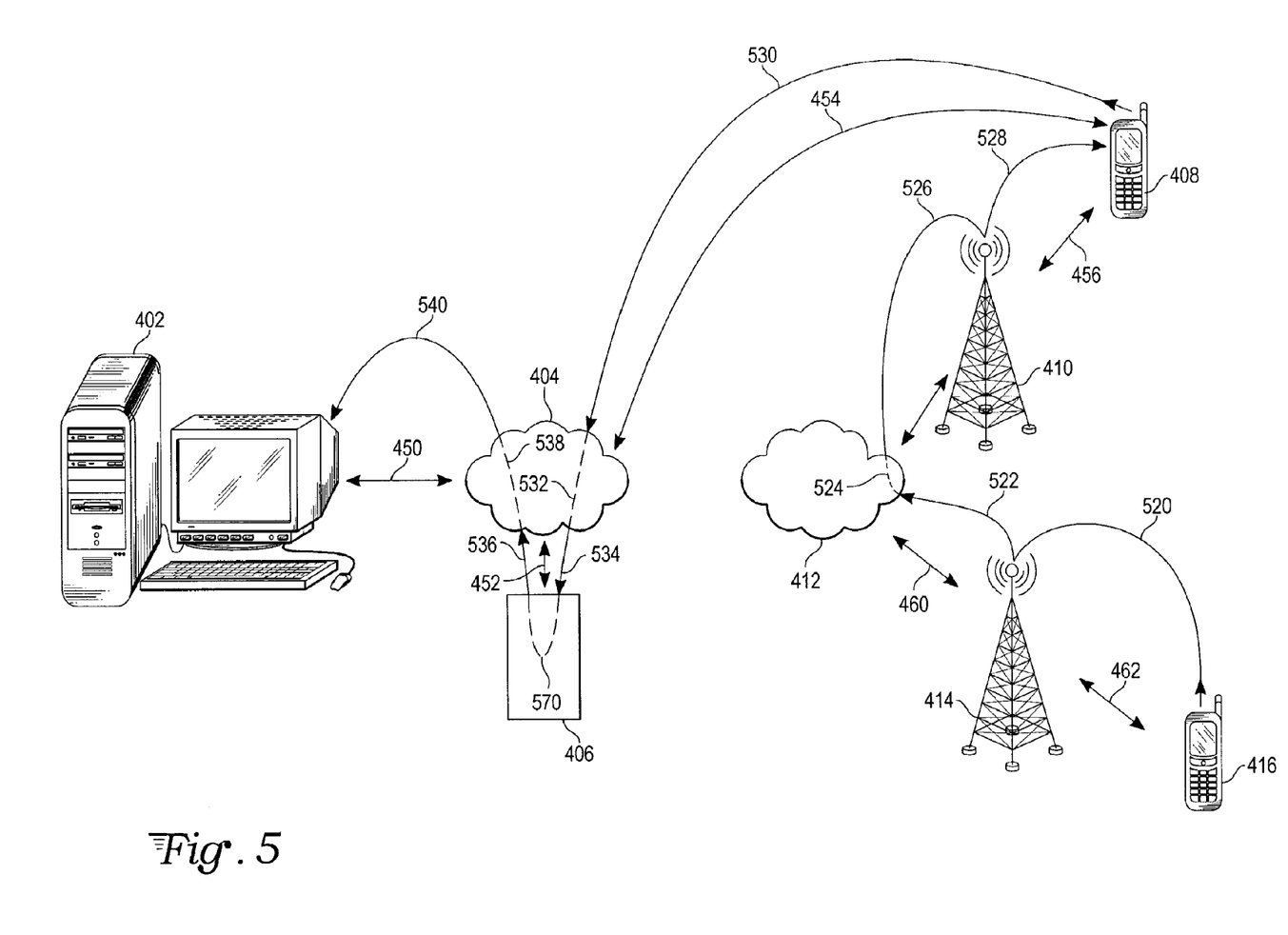
FIG. 5 is a system diagram showing the system of FIG. 4 with an incoming SMS message routed via a server, in accordance with the present invention.

In FIG. 5, a text-based message is received on an Internet connected computer 402 or other Internet connected device from an originating cell phone 416, using the Internet connectable cell phone 408 as a proxy. Similarly to sending a text-based message as depicted in FIG. 4, charges to an aggregator are avoided since an aggregator is not used. A plan allowing unlimited texting on the Internet connectable cell phone 408 is advisable. Connections are the same as shown in FIG. 4, and the text message travels in the reverse direction. The cell phone 416 is an originating cell phone for purposes of receiving a text-based message on the computer 402.

To receive an incoming text-based message on the Internet connected computer 402 from an originating cell phone 416, using the server 406 and the proxy cell phone 408, an originating user enters the text-based message on the originating cell phone 416. To specify a destination for the text-based message, the originating user enters a destination identifier. The destination identifier may be the area code and phone number for the proxy cell phone 408. The incoming message is sent, along with the destination identifier, using an appropriate cellular network-based protocol and format such as SMS. An origin identifier accompanies the message, identifying originating cell phone 416. The origin identifier may be the area code and phone number of the originating cell phone 416. The text-based message travels in a hop 520 from the originating cell phone 416 to the cellular tower 414, in a hop 522 to the cellular network "cloud" 412, in a hop 524 through the cellular network "cloud" 412, in a hop 526 to the cellular tower 410, and in a hop 528 to the proxy cell phone 408, as specified by the destination identifier.

The proxy cell phone 408 receives the incoming text-based message. Depending upon the format or protocol of the text-based message as received by the proxy cell phone 408, the proxy cell phone 408 sends or forwards the text-based message or sends a text-based message derived from the text-based message received. The proxy cell phone 408 sends the text-based message or a derived text-based message in a format and protocol suitable for the Internet. For example, the message may be sent from the originating cell phone 416 over a cellular network using an SMS format, and the cell phone 408 may send the message via the Internet using an instant messaging format, an e-mail format or a text file format. In a further example, the message may arrive via a cellular network and be received by the proxy cell phone 408, with the text-based message having a character length less than or equal to the maximum character count of an SMS message. A plurality of SMS messages may be concatenated or otherwise put together to form a text-based message with a length or character count greater than the maximum character count of an SMS message, in a format suitable for sending over the Internet. Thus, the proxy cell phone 408 sends or forwards the incoming text-based message, a reformatted version of the text-based message, the text-based message using a different protocol, an assembled message from a sequential series of SMS messages, or another message derived from the text-based message.

The proxy cell phone 408 sends or forwards the incoming text-based message by sending the text-based message or a text-based message derived from the received text-based message, in a hop 530 to the Internet "cloud" 404, via the Internet connection 454. The origin identifier, specifying the origin of the message, travels along with the message. The message travels in a hop 532 through the Internet "cloud" 404 and in a hop 534 to the server 406.

The incoming message arrives at and is received by the server 406, accompanied by the origin identifier. The origin identifier indicates that the message has been sent from an originating cell phone 416 and forwarded by the proxy cell phone 408. The server 406 provides access 570 via the Internet to the incoming text-based message and the origin identifier or address of the originating device. Access 570 to the incoming text-based message may be provided by a temporary storage in the server 406, a longer-term storage in the server 406 or other means known in the art.

A Web browser, running on the computer 402, may allow the user to connect to the server 406 via the Internet connection 450, and the user may elect to view the message. In a further example, client software running on the computer 402 may continuously present arriving messages.

The incoming message is sent from the server 406 in a hop 536 to the Internet "cloud" 404, in a hop 538 through the Internet "cloud" 404 and in a hop 540 over the Internet connection 450 to the computer 402. The message is sent from an originating cell phone 416 via the cellular network to the proxy cell phone 408, and forwarded by the proxy cell phone 408 via the Internet to the server 406, or further to the computer 402. If the owner of the cell phone 408 subscribes to unlimited texting and Internet connection, the incoming message is received without incurring any aggregator charges and without incurring any costs per message to the owner of the cell phone 408 or the computer 402.

The user of the proxy cell phone 408 may retrieve an SMS message, via the cellular network, independently of access to the incoming text-based message via the Internet. The incoming text-based message may be stored at the server 406 until the computer 402 or other accessing device establishes or reestablishes communication with the server 406.

Access to the incoming text-based message via the Internet may be made by various Internet connected devices, and is not limited to the use of the computer 402. Further examples of Internet connected devices allowing access include a television set-top box with Internet access, an Internet connected mobile phone, an interactive automotive electronics device with Internet access or a Personal Digital Assistant with Internet access.

In embodiments of the system and method, each of the Internet connected computer 402, the server 406 and the proxy cell phone 408 may be operating client software or other software specific to each device and each function. For example, the user of the computer 402 or other Internet connected device may set up a Web browser to point to the server 406. Using the Web browser, the user may interact with the server, viewing screens and making selections in order to send and receive text-based messages or otherwise remotely manage the proxy cell phone 408. In a further example, the user installs client software in the computer 402 or other Internet connected device, or an Internet connectable device is provided with preloaded client software. The client software executing on the computer 402 or other Internet connected device may show incoming and/or outgoing messages in a dedicated window and keep track of previous messages. Client software may manage formatting and protocols, establish connection with the server 406 or request or display status concerning the cell phone 408, as well as provide additional features.

An operator of a service using the system and method may install, or cause to be installed, server software or server client software on a server 406. The server software or server client software may manage connection to the Internet connected device such as the computer 402, and may manage connection to the proxy cell phone 408. Server software or client software may handle identifiers, directives and interpretations thereof, text-based messages or messages derived from text-based messages, formats, protocols, temporary or longer-term storage of messages, history or status and initiate or participate in actions based upon these.

A user of the system and method may install, or cause to be installed, client software on the proxy cell phone 408. Client software executing on the proxy cell phone 408 may manage connection to the server 406, and may manage connection to the destination cell phone or originating cell phone, automatically making a connection in order to forward a message. Client software may handle identifiers, directives and interpretations thereof, formats, protocols, text-based messages or text-based messages derived from text-based messages and initiate or participate in actions based upon these. For example, proxy cell phone client software may operate to receive a text-based message in a first format using a first protocol, and send the text-based message in a second format using a second protocol, thus performing format conversion and protocol conversion.

Figure 6:
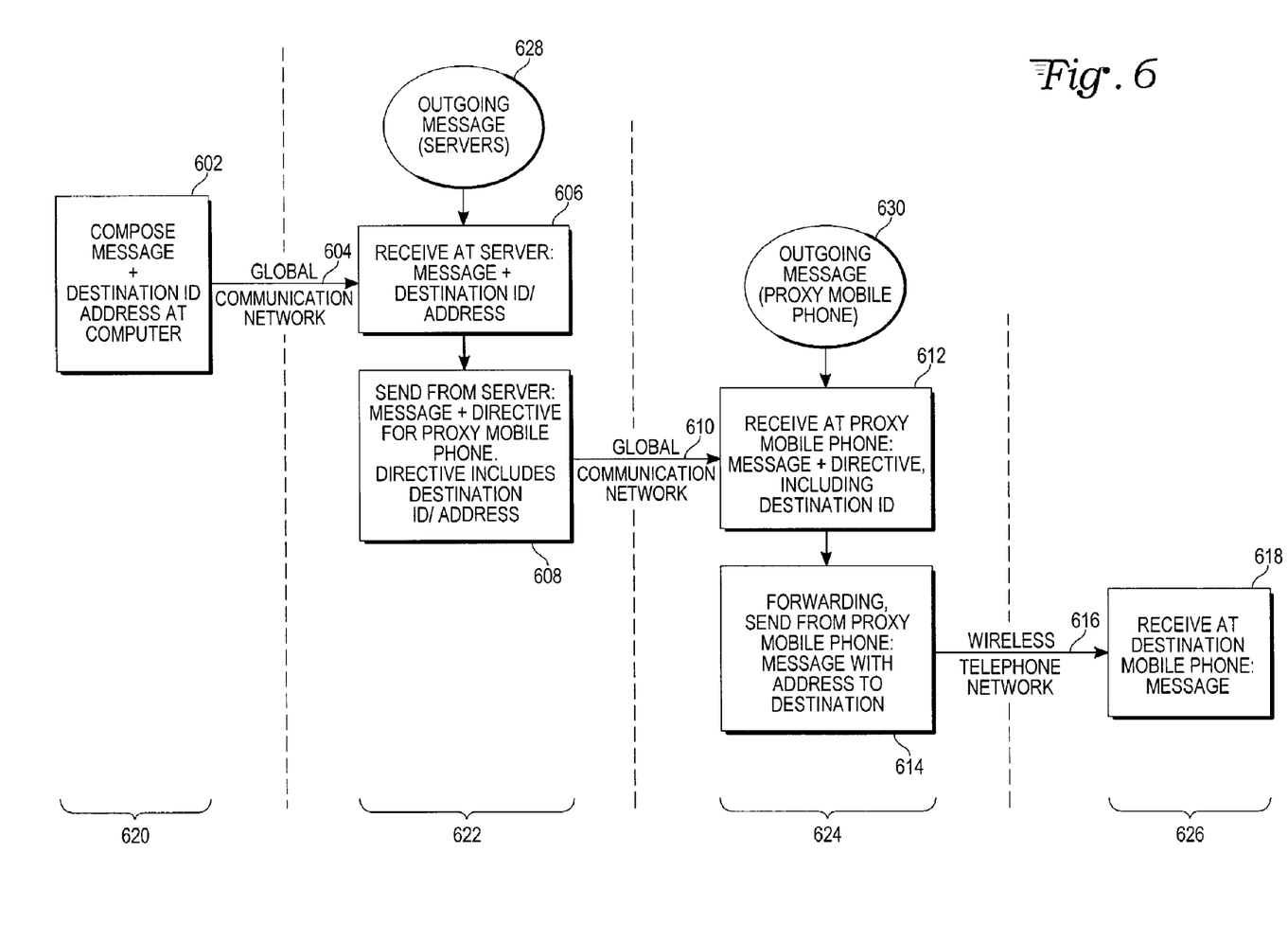
FIG. 6 is a flow diagram of a method for sending SMS messages in accordance with the present invention, as practiced using the system of FIGS. 4 and 5.
Figure 7:
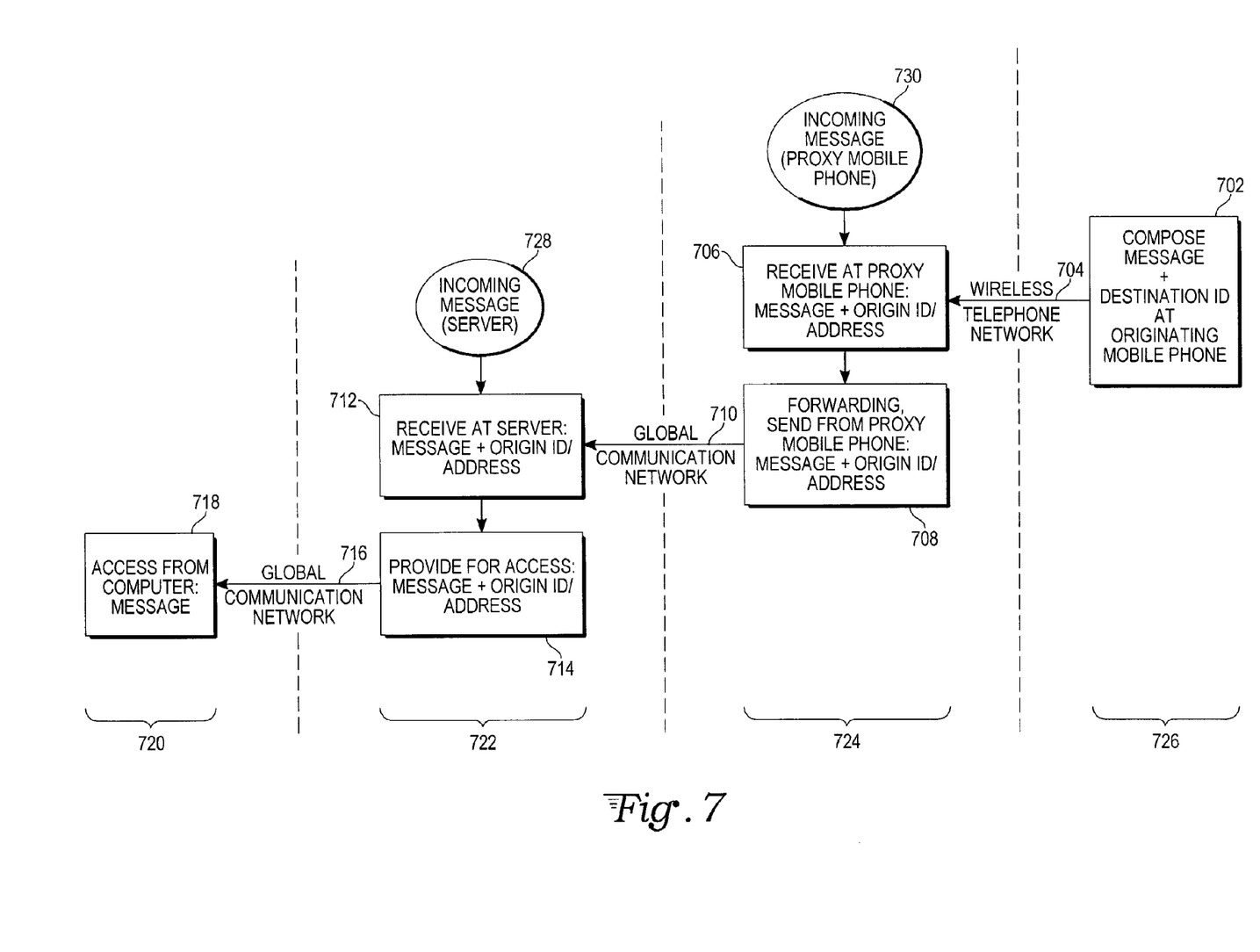
FIG. 7 is a flow diagram of a method for receiving SMS messages in accordance with the present invention, as practiced using the system of FIGS. 4 and 5.

In FIGS. 6 and 7, flow diagrams show sending and receiving text-based messages using the system of FIGS. 4 and 5. FIG. 6 is a flow diagram of sending text-based messages in accordance with an embodiment of the invention. FIG. 7 is a flow diagram of receiving text-based messages in accordance with an embodiment of the invention.

In FIG. 6, computer processes 620, server processes 622, proxy mobile phone processes 624 and destination mobile phone processes 626 are shown, as applied to an outgoing message. The message is outgoing with respect to the proxy mobile phone and the wireless telephonic network. Process label 628 points to an outgoing message process or processes running, executing or operating on the server. Process label 630 points to an incoming message process or processes running, executing or operating on the proxy mobile phone.

At block 602, the message and destination identifier or address are composed at the computer or other global communication network connected device. The destination identifier may be the area code and number of the destination mobile phone, and functions as an address specifying the destination of the message. The message is sent from the computer to the server, over the global communication network 604. As an example, the message is composed on the computer, using instant message, e-mail or file format, and sent over the global communication network known as the Internet. As a further example, the message is composed using a format adapted from SMS but suitable for use in Internet-based communication.

At block 606, the message and the destination identifier or address are received from the computer via the global communication network 604 at the server.

At block 608, the message and a directive for the proxy mobile phone are sent from the server. The message and a directive are sent from the server via the global communication network 610. The message and a directive are sent from the server to the proxy mobile phone. The directive may be the destination identifier or address of the destination mobile phone. In an example, the proxy mobile phone interprets the destination identifier or address as a directive to forward the message to the destination mobile phone over the wireless telephonic network 616. The directive may be an instruction for the proxy mobile phone. In a further example, the proxy mobile phone acts upon the directive to forward the message to the destination mobile phone.

At block 612, the message and the directive, including the destination identifier or address, are received from the server via the global communication network 610 at the proxy mobile phone. In an example, the message and the directive are received from the server over the Internet at the proxy mobile phone.

At block 614, the message is forwarded or sent from the proxy mobile phone, over the wireless telephonic network 616. The message is sent with the address, pointing to the destination as specified by the destination identifier. As an example, the message is sent from the proxy mobile phone to the destination mobile phone over a cellular network. The address or destination identifier, included in the directive, specifies the destination mobile phone.

At block 618, the message is received via the wireless telephonic network 616 at the destination mobile phone. The user of the destination mobile phone may perceive that the message was composed on and sent from the proxy mobile phone, although the message was composed on and originally sent from an Internet connected computer, and forwarded from or by the proxy mobile phone.

In FIG. 7, computer processes 720, server processes 722, proxy mobile phone processes 724 and originating mobile phone processes 726 are shown, as applied to an incoming message. The message is incoming with respect to the proxy mobile phone and the wireless telephonic network. Process label 728 points to an incoming message process or processes running on the server. Process label 730 points to an incoming message process or processes running on the proxy mobile phone.

At block 702, the message and destination identifier (ID) are composed at the originating mobile phone. The destination identifier may be the area code and number of the proxy mobile phone, and functions as an address specifying the destination of the message. The message is sent from the originating mobile phone to the proxy mobile phone, over a wireless telephonic network 704. As an example, the message is composed on a mobile phone using SMS and sent over a cellular network.

At block 706, the message and an origin identifier (ID) or address are received from the originating mobile phone via the wireless telephonic network 704 at the proxy mobile phone. The origin identifier specifies the address or origin of the message. The origin identifier or address may be the area code and number of the originating mobile phone.

At block 708, the message and the origin identifier or address are forwarded or sent from the proxy mobile phone to the server, over the global communication network 710. As an example, the message is reformatted from SMS to instant message, e-mail or file format, and sent over the global communication network known as the Internet.

At block 712, the message and the origin identifier or address are received from the proxy mobile phone via the global communication network 710 at the server.

At block 714, the message and the origin identifier or address are provided at the server for access via the global communication network 716. As an example, the message is available as a file or a portion of a file at the server.

At block 718, the message is accessed from a computer connected to the global communication network 716. As an example, the server sends the message via the global communication network known as the Internet, as soon as the message is received at the server. As a further example, the server stores the message, and sends the message to the computer or other Internet connected device when requested from the computer, such as by an upload request, by a selection from a menu, or when a client software executing on the computer connects with the server.

In a still further example, additional features may be programmed into the server. The server supports full integration with the mobile telephone contacts. When an SMS message is sent or received by the proxy mobile phone, the server synchronizes the contacts by adding any new contact to a contact list. The contact list may be maintained on the server, or forwarded to the mobile telephone by the server, thus synchronizing the contact list on both the server and the mobile telephone. The contact list is viewable by the computing device communicating with the server via the global communication network.

If the user selects an option, the incoming text-based message provided at the server for access by the computing device may include the SMS message itself and some or all of the telephone numbers, the names, and SMS headers information. The system allows reply and broadcasting to multiple users from any mobile telephone available as a proxy mobile phone in the system.

The server provides cloud service support by sending and receiving messages in various secure formats, including https, http, http+AES encryption, http+3DES, https+other encryption methods, UDP/TCP and standard SMS. The server negotiates and accommodates the client capabilities as to formats and protocols of communication and encryption. Authentication is supported at various levels with multi-factors.

Data is stored on the server, allowing access and backup of data from an associated device. Data may be restored to the associated device or to a replacement device. Full interaction is allowed from a browser or client software executing on a computing device connected via the global communication network to the server. Data on the server may be stored secured and encrypted.

Either or both of the computing device and the proxy mobile phone may communicate with the server via the global communication network using a wireless, a mobile over the air (OTA), or a wireline connection.

A software development kit (SDK) allows creation of SMS sending and receiving by drag and drop or touch on a user interface for new applications. A user can drag and drop a text from a work document with rich format to a graphical user interface (GUI) on a webpage or a PC client. The software development kit, executing on a personal computer or other computing device, or the server, formats the text and sends the text to the proxy mobile phone, and the proxy mobile phone handles the SMS message.

What is claimed is:

1. A method for sending and receiving text-based messages comprising:
    A) sending an outgoing text-based message, including:
        receiving via a global communication network, at a server, an outgoing text-based message in a global communication network-based format and a destination identifier associated with a destination device on a wireless telephonic network; and
        sending via the global communication network, from the server, the outgoing text-based message and a directive for a proxy mobile phone to receive the outgoing text-based message via the global communication network and to forward the outgoing text-based message in a wireless telephonic network-based format via the wireless telephonic network to the destination device specified by the destination identifier; and
    B) receiving an incoming text-based message, including:
        receiving via the global communication network, at the server, an incoming text-based message in the global communication network-based format and an origin identifier associated with an originating device on the wireless telephonic network and indicating that the incoming text-based message has been received in the wireless telephonic network-based format via the wireless telephonic network at the proxy mobile phone and forwarded by the proxy mobile phone to the server via the global communication network; and
        providing from the server the incoming text-based message in the global communication network-based format for access via the global communication network.

2. The method of claim 1 wherein the incoming text-based message in the wireless telephonic network-based format is retrievable via the wireless telephonic network independently of access to the incoming text-based message in the global communication network-based format via the global communication network.

3. The method of claim 1 further comprising storing the outgoing text-based message at the server pending establishment or reestablishment of a communication between the server and the proxy mobile phone.

4. The method of claim 1 further comprising storing the incoming text-based message at the server pending establishment or reestablishment of a communication between the server and an accessing device.

5. The method of claim 1 wherein a computing device accesses the incoming text-based message via the global communication network by using client software or a browser.

6. The method of claim 1 wherein to forward the outgoing text-based message in a wireless telephonic network-based format includes:
    breaking up a text-based message having a character count greater than a Short Message Service (SMS) message maximum character count into a plurality of SMS messages, each SMS message having a character count less than or equal to the SMS message maximum character count; and
    sending sequentially the plurality of SMS messages.

7. The method of claim 1 wherein the incoming text-based message in the global communication network-based format includes a text-based message having a character count greater than an SMS message maximum character count assembled from a plurality of SMS messages, each SMS message having a character count less than or equal to the SMS message maximum character count.

8. The method of claim 1 wherein the proxy mobile phone sends and receives via the global communication network using one of:
    a wired connection to the global communication network;
    a wireless connection to the global communication network; or
    a cellular network portal to the global communication network.

9. The method of claim 1 wherein access to the incoming text-based message in the global communication network-based format via the global communication network is by one of:
- a computer;
- a set-top box;
- a mobile phone; or
- an interactive automotive electronics device.

10. The method of claim 1 wherein the proxy mobile phone is a cellular telephone, the wireless telephonic network is a cellular network and the wireless telephonic network-based format is the Short Message Service format.

11. A system for sending and receiving text-based messages comprising:
- a server connectable to a global communication network;
- a client equipped mobile phone connectable to a wireless telephonic network, connectable to the global communication network, and configured to communicate with the server via the global communication network;
- the server being configured to send via the global communication network an outgoing text-based message to the client equipped mobile phone in response to receiving the outgoing text-based message via the global communication network, the outgoing text-based message being addressed to a recipient mobile phone;
- the client equipped mobile phone being configured to send via the wireless telephonic network an outgoing text-based message in a wireless telephonic network-based format derived from the outgoing text-based message and addressed to the recipient mobile phone in response to receiving the outgoing text-based message via the global communication network from the server;
- the client equipped mobile phone further being configured to send to the server via the global communication network an incoming text-based message derived from an incoming text-based message received in the wireless telephonic network-based format via the wireless telephonic network; and
- the server further being configured to provide access to the incoming text-based message via the global communication network.

12. The system of claim 11 wherein the client equipped mobile phone is further configured to retrieve the incoming text-based message in the wireless telephonic network-based format via the wireless telephonic network independently of access to the incoming text-based message via the global communication network.

13. The system of claim 11 further comprising an outgoing data storage at the server, for storing the outgoing text-based message pending establishment or reestablishment of communication between the server and the client equipped mobile phone via the global communication network.

14. The system of claim 11 further comprising an incoming data storage at the server, for storing the incoming text-based message pending establishment or reestablishment of communication between a server and a computing device via the global communication network.

15. The system of claim 11 further comprising a computing device communicating with the server by executing client software or operating a browser.

16. The system of claim 11 wherein the server or the client equipped mobile phone is further configured to break up a text-based message having a character count greater than an SMS message maximum character count into a plurality of SMS messages, each SMS message having a character count less than or equal to the SMS message maximum character count.

17. The system of claim 11 wherein the server or the client equipped mobile phone is further configured to assemble a text-based message having a character count greater than an SMS message maximum character count from a plurality of SMS messages, each SMS message having a character count less than or equal to the SMS message maximum character count.

18. The system of claim 11 wherein the client equipped mobile phone connectable to the global communication network includes one of:
- a wired connection to the global communication network;
- a wireless connection to the global communication network; or
- a cellular network portal to the global communication network.

19. The system of claim 11 wherein the proxy mobile phone is a cellular telephone, the wireless telephonic network is a cellular network and the wireless telephonic network-based format is the Short Message Service format.

20. A method for sending and receiving text-based messages comprising:
A) sending an outgoing text-based message, including:
- receiving via a global communication network, at a server, an outgoing text-based message in a global communication network-based format with an address of a destination device on a wireless telephonic network;
- sending via the global communication network, from the server to a proxy mobile phone, the outgoing text-based message in the global communication network-based format and the address of the destination device; and
- forwarding via the wireless telephonic network, from the proxy mobile phone, the outgoing text-based message in a wireless telephonic network-based format, with the address of the destination device; and B) receiving an incoming text-based message, including:
- receiving via the wireless telephonic network, at the proxy mobile phone, an incoming text-based message in the wireless telephonic network-based format with an address of an originating device on the wireless telephonic network;
- forwarding via the global communication network, from the proxy mobile phone to the server, the incoming text-based message in the global communication network-based format and the address of the originating device; and
- providing from the server the incoming text-based message in the global communication network-based format and the address of the originating device for access via the global communication network.

* * * * *